US008447357B2

(12) United States Patent
Jung et al.

(10) Patent No.: US 8,447,357 B2
(45) Date of Patent: *May 21, 2013

(54) APPARATUS AND METHOD FOR IDENTIFYING A SIM CARD OWNER

(75) Inventors: Yong Hwan Jung, Kwangju (KR); Sun Tae Jo, Kyungki-Do (KR); Tae Gyun Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 976 days.

This patent is subject to a terminal disclaimer.

(21) Appl. No.: 12/036,566

(22) Filed: Feb. 25, 2008

(65) Prior Publication Data

US 2008/0146282 A1    Jun. 19, 2008

Related U.S. Application Data

(63) Continuation of application No. 10/137,303, filed on May 3, 2002, now Pat. No. 7,360,711.

(30) Foreign Application Priority Data

May 4, 2001   (KR) ................................. 2001-24437
May 4, 2001   (KR) ................................. 2001-24438

(51) Int. Cl.
*H04B 1/38*    (2006.01)

(52) U.S. Cl.
USPC ............... 455/558; 365/51; 365/63; 235/486; 235/492

(58) Field of Classification Search
USPC .............. 455/558, 406, 432.1, 432, 435, 426, 455/550.1, 551, 557, 575, 90, 411, 408, 566; 370/335, 342, 441; 365/63, 51; 235/486, 235/492

See application file for complete search history.

(56) References Cited

U.S. PATENT DOCUMENTS 5,815,426 A * 9/1998 Jigour et al. ................... 365/51
5,867,795 A   2/1999 Novis et al.

(Continued)

FOREIGN PATENT DOCUMENTS

CN   1191358 A    8/1998
EP   0831629 A2   3/1998

(Continued)

OTHER PUBLICATIONS

P. Maes, "Subscriber Identity Module for Pan-European Mobile Telephone Network," Smart Card Technology, vol. 2, 1990, p. 1-13.

*Primary Examiner* — April G Gonzales
(74) *Attorney, Agent, or Firm* — KED & Associates, LLP (57) ABSTRACT

A communications terminal is provided. The terminal has a SIM card reader that allows a user to easily identify the owner of a SIM card. Owner identification data may be stored on the SIM card, and when power is first applied to the communications terminal, the owner identification data may be read from the SIM card and played by the communications terminal, including reading an image from the SIM card and displaying the image on a display screen of the communications terminal, and/or reading audio data from the SIM card and playing the audio data over a speaker of the communications terminal. Owner identifying data may be attached to a SIM card. When inserted into a receiving slot of a communications terminal, the identifying data may be viewed through a transparent window adjacent the SIM card receiving slot, either in the terminal itself, or in a SIM card holder attached to the SIM card and inserted into a slot.

18 Claims, 5 Drawing Sheets

U.S. PATENT DOCUMENTS

| | | | | |
|---|---|---|---|---|
| 5,877,975 A * | 3/1999 | Jigour et al. | ................... | 365/52 |
| 5,979,771 A * | 11/1999 | Adams et al. | ................. | 235/486 |
| 6,026,007 A * | 2/2000 | Jigour et al. | ................... | 365/51 |
| 6,047,198 A | 4/2000 | Sudo | | |
| 6,112,996 A * | 9/2000 | Matsuo | ....................... | 235/492 |
| 6,175,517 B1 * | 1/2001 | Jigour et al. | ................... | 365/63 |
| 6,199,158 B1 * | 3/2001 | Hirsch | .............................. | 713/1 |
| 6,230,002 B1 * | 5/2001 | Floden et al. | ................. | 455/411 |
| 6,292,561 B1 * | 9/2001 | Benson | ................... | 379/433.13 |
| 6,381,477 B1 * | 4/2002 | Johnson et al. | ............. | 455/572 |
| 6,400,965 B1 * | 6/2002 | Phillips et al. | ................ | 455/558 |
| 6,461,193 B1 * | 10/2002 | Matthies | ...................... | 439/509 |
| 6,504,932 B1 * | 1/2003 | Vasnier et al. | ................. | 380/273 |
| 6,594,154 B1 | 7/2003 | Brewer et al. | | |
| 6,612,498 B1 * | 9/2003 | Lipponen et al. | ............ | 235/486 |
| 6,667,748 B1 * | 12/2003 | Hubbe et al. | ................... | 715/723 |
| 6,714,799 B1 * | 3/2004 | Park et al. | ..................... | 455/558 |
| 6,738,047 B2 | 5/2004 | Kobayashi | | |
| 7,360,711 B2 * | 4/2008 | Jung et al. | ..................... | 235/492 |
| 2001/0038547 A1 * | 11/2001 | Jigour et al. | ................... | 365/43 |
| 2002/0045465 A1 * | 4/2002 | Kishida et al. | ................ | 455/566 |
| 2002/0169958 A1 * | 11/2002 | Nyman et al. | ................ | 713/168 |

FOREIGN PATENT DOCUMENTS

| | | |
|---|---|---|
| EP | 1199868 A1 | 4/2002 |
| JP | 411331334 A | 11/1999 |
| WO | WO 99/64976 | 12/1999 |
| WO | WO 0033562 | 6/2000 |
| WO | WO 01/15413 A1 | 3/2001 |

* cited by examiner

APPARATUS AND METHOD FOR IDENTIFYING A SIM CARD OWNER

This application is a Continuation of U.S. patent application Ser. No. 10/137,303, filed May 3, 2002 now U.S. Pat. No. 7,360,711, the entirety of which is incorporated herein by reference. This application claims priority under 35 U.S.C. §119 to Korean Application Serial No. 2001-24437 filed on May 4, 2001 and Korean Application Serial No. 2001-24438 filed on May 4, 2001.

BACKGROUND OF THE INVENTION

1. Field of the Invention

The present invention relates to a GSM terminal, and more particularly, to an apparatus and method for identifying a SIM (Subscriber Identify Module) card owner in a GSM terminal.

2. Background of the Related Art

Generally, a Global System for Mobile communication (GSM) terminal using a time division multiple connection method uses Subscriber Identity Module (SIM) cards. The SIM card is a removable smart card comprised of a microprocessor and a memory chip. In the memory chip, personal information of a SIM card owner and other information, including (phone numbers and network numbers) are stored. In addition, personal certification information such as a Personal Identification Number SPIN) and a Personal Unblocking Key (PUK) of the SIM card owner are stored.

Personal certification information stored in the memory chip enables verification of the SIM card owner by determining whether the SIM card owner is registered for the network when the SIM card is inserted into the mobile communication terminal. Typically, after inserting the SIM card in the GSM terminal, the user inputs his or her PIN. Then, the microprocessor determines whether the SIM card owner is a registered user by comparing the PIN entered by the user with the PIN stored in the memory chip. If the two PINs match, the microprocessor permits the user access to the GSM terminal. If the two PINs are different, the microprocessor blocks the use of the terminal. If the user fails to enter the correct PIN in three attempts, the user must then enter the PUK in order to release the blocking of the terminal.

In the prior art systems, there was no way to verify the SIM card owner other than by inserting SIM into a GSM terminal, turning on the terminal power and entering the PIN. Moreover, it has been virtually impossible to identify one's own SIM card with the naked eye because all SIM cards are basically identical in appearance.

SUMMARY OF THE INVENTION

An object of the invention is to solve at least the above problems and/or disadvantages and to provide at least the advantages described hereinafter.

One objective of the present invention is to provide an apparatus and method for visually verifying a SIM card owner in a GSM terminal.

Another objective of the present invention is to provide a mobile telephone designed to allow visual verification of SIM card ownership once a visually verifiable SIM card is inserted into the mobile telephone.

To achieve these and other advantages and in accordance with the purpose of the present invention, as embodied and broadly described herein, in an apparatus embodying the invention, image data of a user is stored in a SIM card, and a terminal that uses the SIM card is configured to read the image data of the user from the SIM card and to display the image data when power is first applied to the terminal.

Here, the SIM card is composed of a memory chip and a microprocessor and the memory chip is comprised of: (1) a personal certification storage unit where personal certification information is stored; (2) a registration data storage unit where data related to base station registration is stored; and (3) an owner identification data storage unit where data related to a SIM card owner is stored.

A method embodying the invention can include the steps of storing owner identification data in a SIM card, positioning the SIM card in a terminal, displaying a selection message asking whether to display the owner identification data when power is first applied to the terminal, and displaying the owner identification data according to the user's response to the selection message.

In other embodiments of the invention, the SIM card has a user verification means. A SIM card insertion slot is positioned in the body of a terminal, and a SIM card checking unit is positioned in the body of a terminal. The SIM card checking unit is designed to allow a user to see the user verification means on the SIM card, even after the SIM card has been mounted in the terminal.

A SIM card embodying the invention has a microprocessor and a memory chip built therein, and a visual verification means on at least one of the sides of the SIM card.

BRIEF DESCRIPTION OF THE DRAWINGS

The invention will be described in detail with reference to the following drawings, in which like reference numerals refer to like elements, and wherein.

DETAILED DESCRIPTION OF PREFERRED EMBODIMENTS

Reference will now be made in detail to preferred embodiments of the present invention, examples of which are illustrated in the accompanying drawings.

Figure 1:
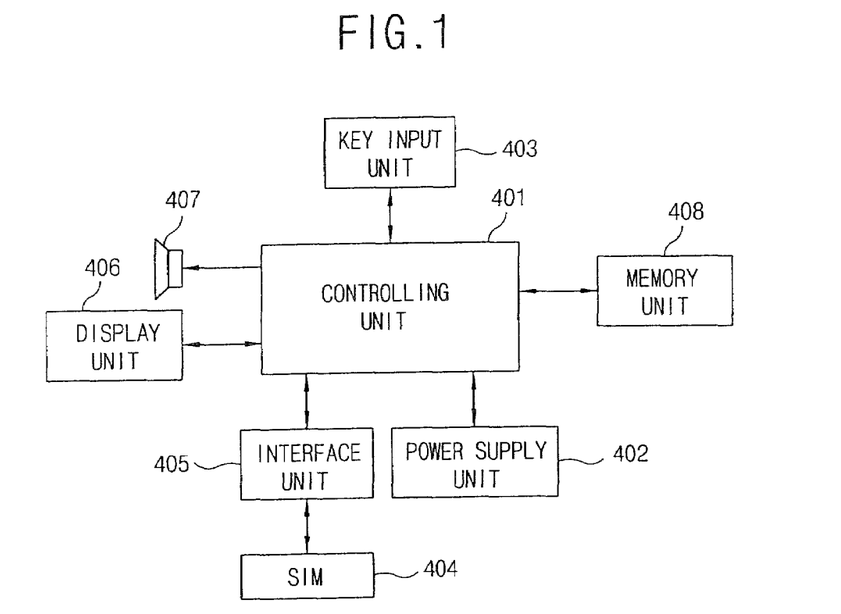
FIG. 1 is a block diagram showing a first embodiment of an apparatus for verifying a SIM card owner in a GSM terminal in accordance with the present invention.

As shown in FIG. 1, an apparatus for verifying a SIM card owner in a GSM terminal includes a controlling unit 401 for controlling the system and processing signals, a power supply unit 402 for supplying power to the terminal, a key input unit 403 for inputting key data, an interface unit 405 for interfacing the SIM card with the controlling unit 401, a display unit 406 for displaying image data of the user stored in the SIM card 404, a speaker 407 for outputting audio data, and a memory unit 408 for storing image or audio data transmitted through the interface unit 405 or wireless data transmitted from or to the terminal.

Figure 2:
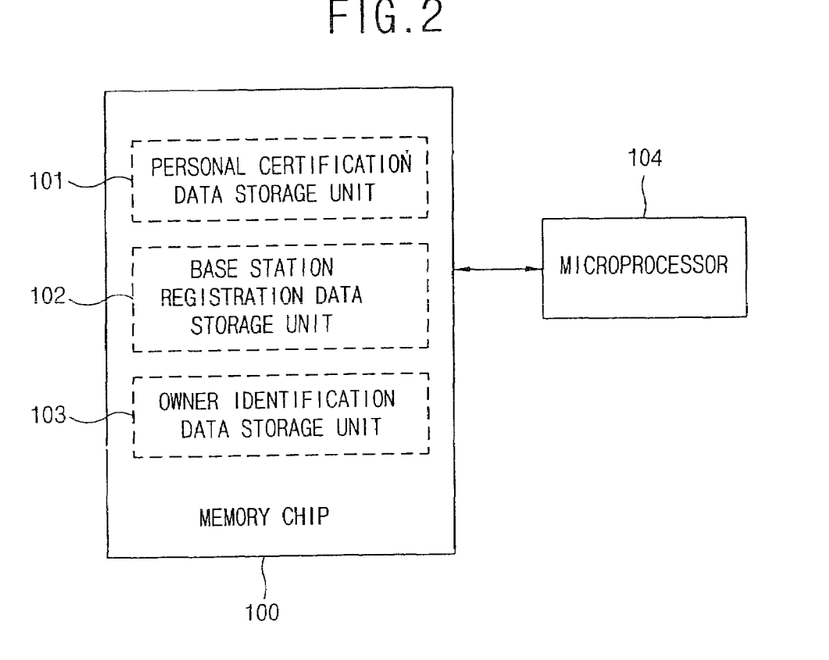
FIG. 2 is a block diagram of a SIM card embodying the invention.

As shown in FIG. 2, the SIM card 404 includes a memory chip 100 and a microprocessor 104. The memory chip 100 includes a personal certification data storage unit 101 where a PIN is stored, a registration data storage unit 102 where data related to base station registration is stored, and an owner identification data storage unit 103 where image data (photographs, animations and characters) and/or audio data related to a SIM card owner is stored.

Figure 3:
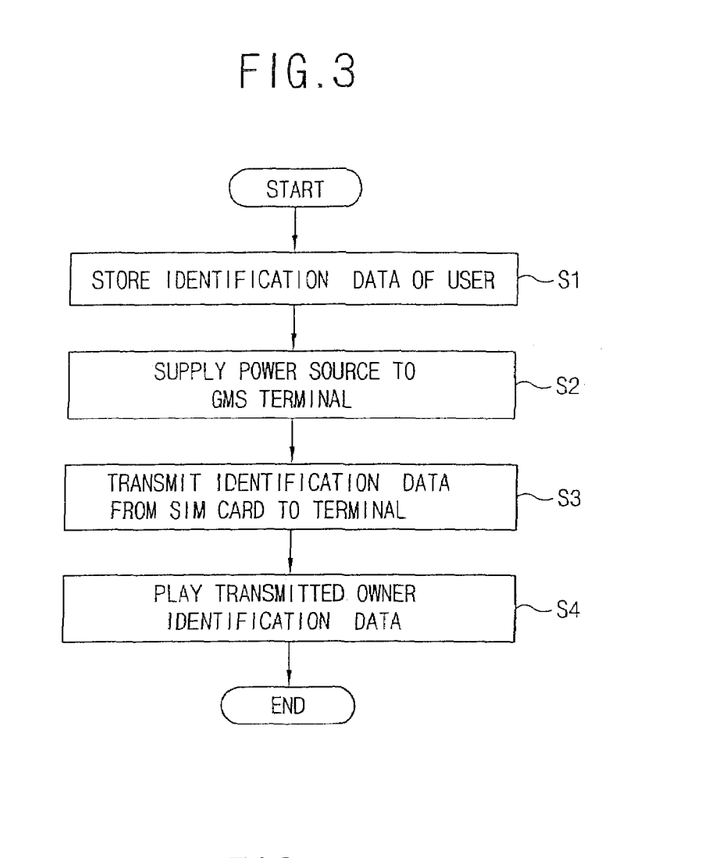
FIG. 3 is a flow chart showing a method embodying the invention for verifying a SIM card owner.

The operation of an apparatus for verifying the SIM card owner in the GSM terminal in accordance with the present invention will be described with reference to FIG. 3. As shown in FIG. 3, the SIM card owner stores verifiable image and/or audio data in the memory chip 100 of the SIM card 404 (S1). The SIM card owner can store owner identification data in the owner identification data storage unit 103 of a SIM card through data transmitted from a base station. Alternatively, the user could download image and/or audio data to the SIM card using a Personal Computer that interfaces with the SIM card. In still other embodiments of the invention, image and/or audio data can be transmitted to a communications terminal holding the SIM card using a wireless Internet connection.

When the power of the key input unit 403 is turned on after positioning the SIM card 404 in the GSM terminal, the power supply unit 402 supplies a power to each device of the GSM terminal (S2). When the power is supplied, the microprocessor 104 of the SIM card 404 reads data from the owner identification data storage unit 103 and transmits the data to the controlling unit 401 through the interface unit 405 (S3). If the data stored on the data storage unit 103 is image data, the controlling unit 401 converts the data into a displayable form and outputs the data to the display unit 406, the image is displayed (S4). Alternatively, if the data retrieved from the data storage unit includes audio data, the controlling unit would convert the data into a playable form, and the audio data would then be played over the speaker 407 of the terminal.

Figure 4:
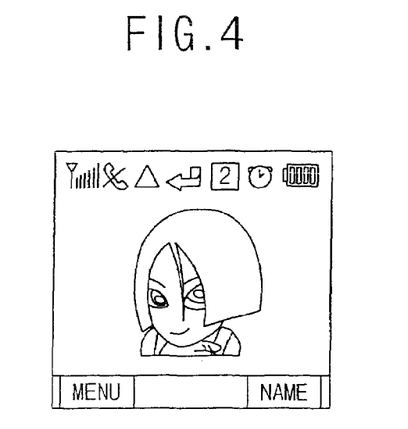
FIG. 4 is a view illustrating an example of image data of a user displayed on a display unit of a terminal.

FIG. 4 shows a display unit 406 of a terminal which is displaying image data. Because the image data (photographs) of the SIM card owner are displayed on the LCD screen of the display unit, a user can visually verify the ownership of the SIM card. Then, the conventional verification method of entering a PIN is performed. With the present invention, when power is first applied to the GSM terminal, the user can easily determine the card owner through the automatic display of the owner's image data which has been stored in the SIM card.

In some embodiments of the invention, the mobile communications terminal can be configured to automatically display the image data upon application of power to the terminal. In other embodiments of the invention, when power is applied to the terminal, the terminal may give the user the option of skipping the display of image data. More specifically, when the power is first applied, the controlling unit 401 may prompt the user to select whether to have the image data displayed on the display screen of the display unit 406, or to skip the display. If the user asks to have the image data displayed, the controlling unit 401 displays the image data received from the owner identification data storage unit 103 on the display screen of the display unit 406.

As mentioned above, audio data, such as voice data of the SIM card owner, can also be stored with image data in the SIM card. The terminal can then output the voice data of the SIM card owner through a speaker 407 when the image data is displayed. Thus the verification of the SIM card owner is performed more effectively. Also, in some embodiments, only audio data is recorded in the SIM card and played upon application of power.

Figure 5:
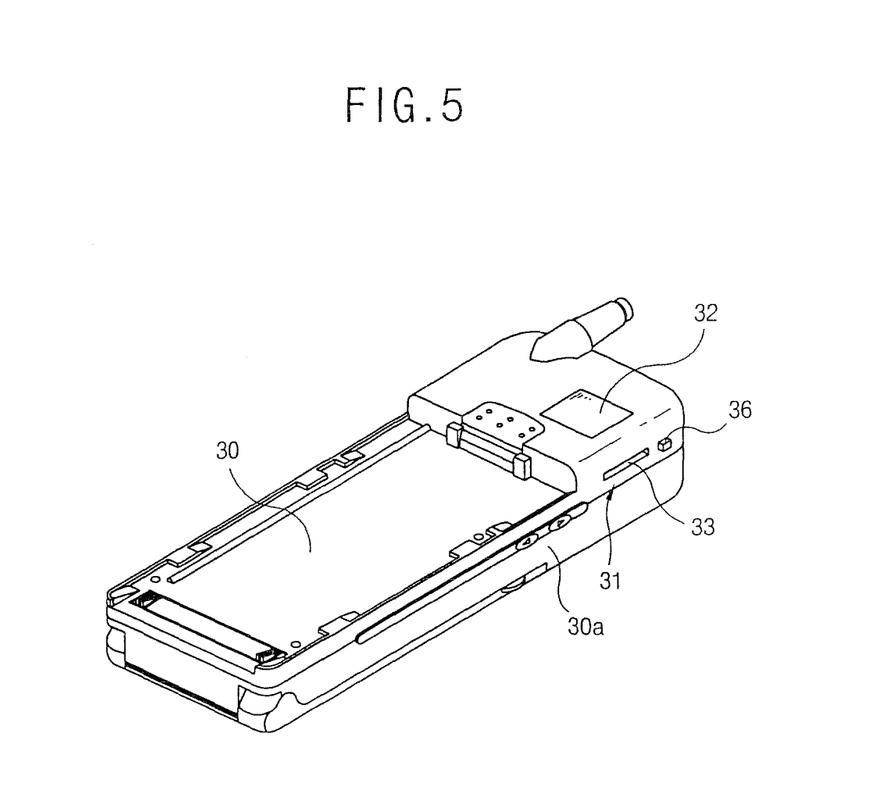
FIG. 5 is a perspective view of a mobile communications terminal embodying the present invention.
Figure 6:
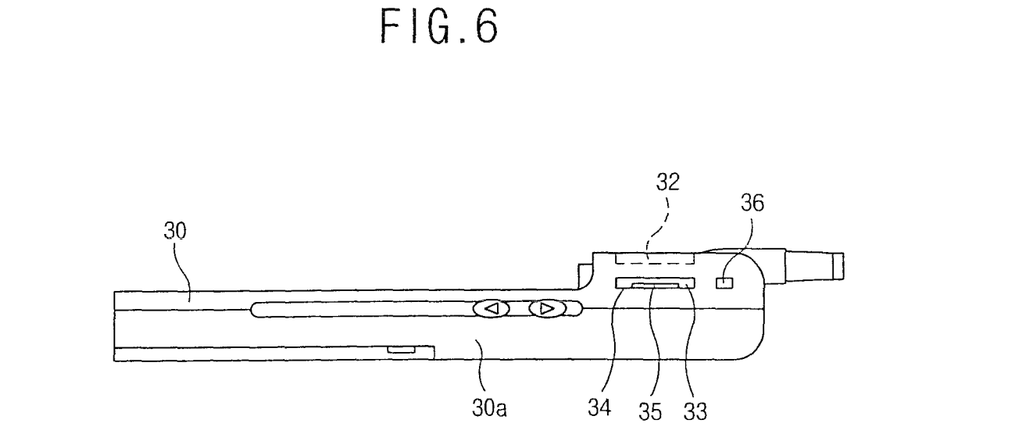
FIG. 6 is a side view of the mobile communications terminal of FIG. 5.

FIG. 5 is a plan view showing another embodiment of the invention which allows a user to easily verify the SIM card owner. As shown in FIG. 5, in this embodiment, the communications terminal includes a SIM card receiving unit 31 positioned at one side surface 30A of the communications terminal 30. The terminal 30 includes a SIM card verifying unit 32 for verifying the SIM card inserted in the insertion slot 33 with the naked eye. As shown in FIG. 6, a connector 35 designed to interface with a SIM card is located on the lower surface 34 of the insertion slot 33. A discharge button 36 for discharging a SIM card inserted in the SIM card receiving unit 31 is formed near the insertion slot 33.

The SIM card verifying unit 32 has a transparent window and the transparent window is positioned so that one of the sides of the SIM card inserted in the SIM card receiving unit 31 can be visually verifiable by the user. This transparent window is positioned on either the front or rear surface of the terminal body 30.

Another method of verifying the SIM card owner does not require positioning the SIM card in a communications terminal. In other words, the ownership of a SIM card can be visually verified by marking at least one side of the SIM card with some type of personal indicia, such as the owner's name. When the SIM card itself is marked with personal identifying information, the SIM card owner can be easily visually verified without positioning the card in a communications terminal.

Figure 7:
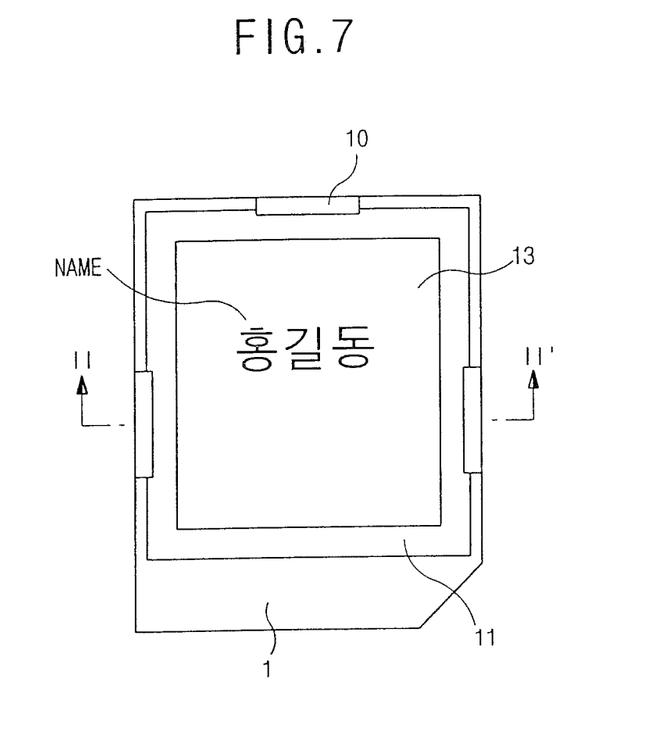
FIG. 7 is a plan view of a SIM card embodying the invention having a user verification means thereon.
Figure 8:
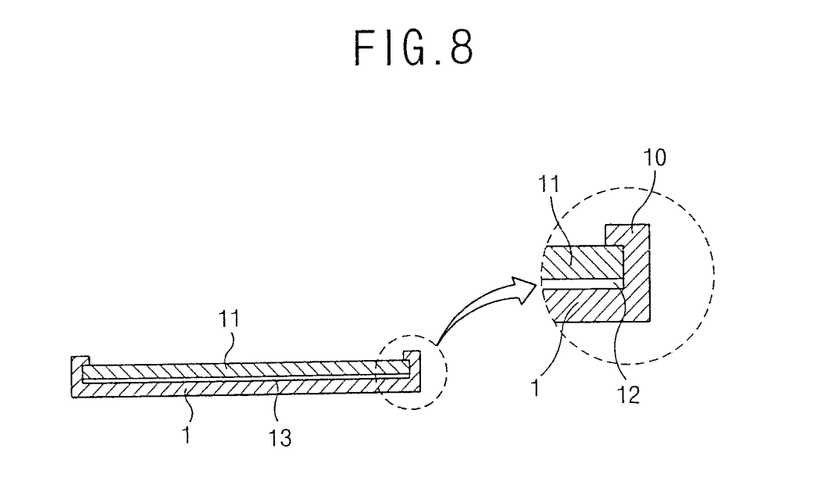
FIG. 8 is a sectional view taken along section line II-II in FIG. 7.
Figure 9:
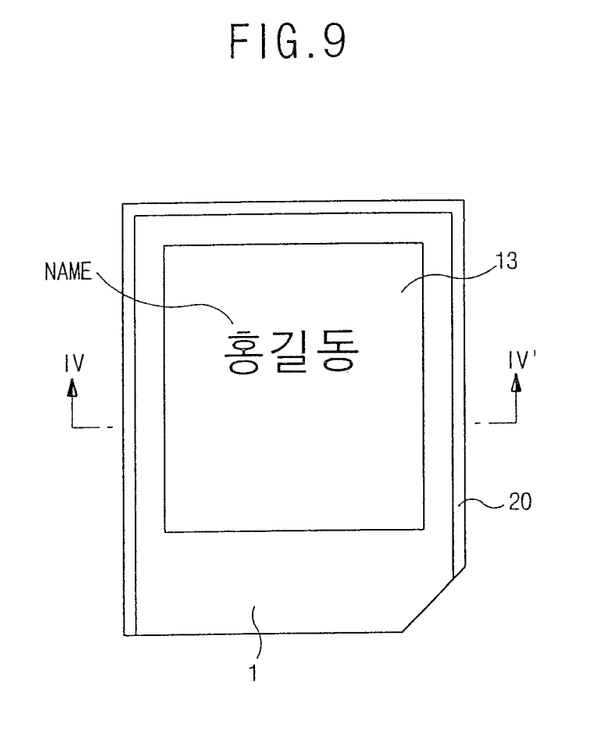
FIG. 9 is a plan view showing another embodiment of a SIM card having a user verification means thereon.
Figure 10:
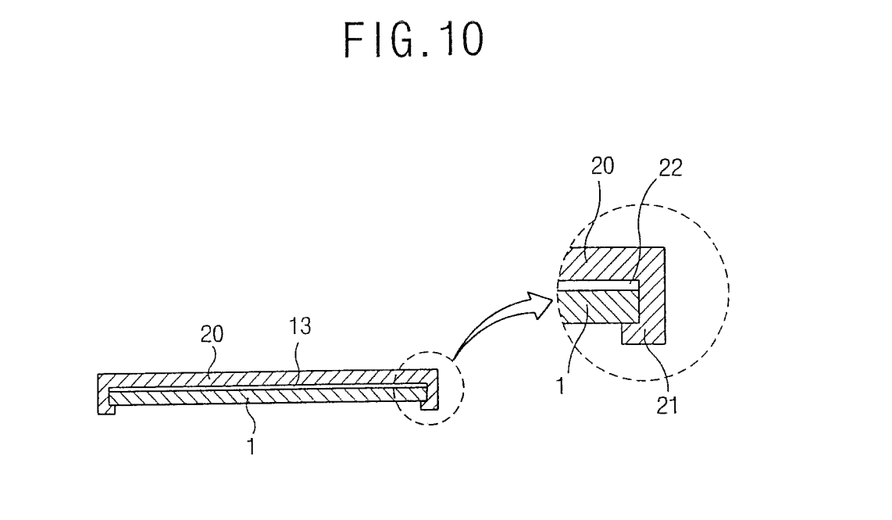
FIG. 10 is a cross-sectional view taken along section line IV-IV in FIG. 9.

FIGS. 7 and 9 are plan views showing embodiments of a SIM card in accordance with the present invention. FIGS. 8 and 10 are sectional views taken along section lines II-II and IV-IV of FIGS. 7 and 9, respectively.

As shown in FIGS. 7 and 8, in one embodiment of the invention, one or more concave fixing pieces 10 are attached around side surfaces of a SIM card 1. A transparent plate 11 is then held against the SIM card 1 by the concave fixing pieces 10. Photographs, tags or labels 13 can be mounted in the slot 12 between the SIM card 1 and the transparent window 11.

In another embodiment, as shown in FIGS. 9 and 10, a transparent cover 20 is mounted on a SIM card 1. The transparent cover includes a groove part 21 on side edges of the transparent cover 20 to hold the transparent cover on the SIM card 1. The groove part 21 can be formed as a continuous groove, or the groove part 21 can be formed on the transparent cover 20 at intervals. A SIM card 1 is then slidably inserted into the transparent cover. Photographs, tag or labels 13 can be inserted into the slot 22 formed between the SIM card 1 and the transparent cover 20. In preferred embodiments of the invention, the groove part 21 is formed on three side surfaces of the transparent cover 20.

The embodiments of the present invention shown in FIGS. 7-10 allow a user to attach a photograph or name tag on a surface of the SIM card using adhesive or double-faced tape. This allows the user to visually identify his SIM card from the SIM cards belonging to other users. Also, it allows a user to verify the identity of a SIM card without positioning the SIM card in the terminal. Even when the SIM card is mounted in the terminal, a transparent window in the terminal would still allow the user to check the SIM card to determine if it is his own.

As described above, in some embodiments of the invention, the user can visually verify the SIM card owner by displaying image data on a display screen of a terminal, and/or by playing audio data over a speaker when power is first applied. In other embodiments of the invention, the user can easily verify the owner of a SIM card based on a photograph or name tag attached to the SIM card, without the need to insert the SIM card into a terminal. When a SIM card bears some identifying material, a communications terminal embodying the invention would include a transparent window that allows a user to see the identifying material, even when the SIM card is mounted within the communications terminal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A Subscriber Identity Module (SIM) card for a mobile communications terminal, the SIM card comprising:
    a memory chip configured to receive and to store image data and audio data, wherein the memory chip comprises:
        a personal verification storage area configured to receive and to store personal information;
        a registration data storage area configured to receive and to store data related to base station registration; and
        an owner data storage area configured to receive and to store image data and audio data, wherein the audio data includes audio information associated with an owner of the SIM card, wherein the SIM card allows image data from the memory chip to be displayed on a display portion of a mobile communications terminal to which the SIM card is operably coupled, and wherein the SIM card allows audio data to be transmitted from the SIM card and output through a speaker of a mobile communications terminal to which the SIM card is operably coupled; and
    a microprocessor configured to write image data and audio data to the memory chip, and to read image data and audio data from the memory chip,
    wherein when the image data read from the memory chip includes audio data, the SIM card is configured to automatically play the audio data through the speaker of the mobile communications terminal when the image data is displayed on the display portion of the mobile communications terminal.

2. The SIM card of claim 1, wherein the personal info information stored in the personal verification storage area includes a personal identification number (PIN) that allows for use of the mobile communications terminal and access to other data stored on the memory chip.

3. The SIM card of claim 1, wherein the microprocessor is configured to receive image data and audio data from an interface unit of a mobile communications terminal to which the SIM card is operably coupled, and to store the image data and the audio data in the owner data storage area of the memory chip.

4. The SIM card of claim 3, wherein the image data from the memory chip that is displayed on the display portion includes pictures or characters associated with the owner of the SIM card.

5. The SIM card of claim 3, wherein the SIM card is configured to receive the image data and the audio data through the interface unit from a base station servicing the mobile communications terminal, from a personal computer that interfaces with the SIM card, or through a wireless connection.

6. The SIM card of claim 1, wherein the SIM card is configured to transmit the audio data through the speaker of the mobile communications terminal, when power is first applied to the mobile communications terminal for identification of the owner of the SIM card.

7. The SIM card of claim 1, wherein the microprocessor is configured to receive image data and audio data from an interface unit of a mobile communications terminal to which the SIM card is operably coupled, and to store the image data and the audio data in corresponding allocated storage spaces in the memory chip.

8. A mobile communications terminal comprising the SIM card of claim 1.

9. The SIM card of claim 1, wherein the SIM card is configured to automatically display image data on the display portion of the mobile communications terminal when power is first applied to the mobile communications terminal for identification of the owner of the SIM card.

10. A mobile communications terminal, comprising:
    a Subscriber Identity Module (SIM) card reader configured to read, from a SIM card, image data and audio data for identification of the SIM card;
    a display screen, wherein the mobile communications terminal is configured to display the image data read from the SIM card on the display screen for identification of the SIM card; and
    a speaker, wherein the mobile communications terminal is configured to output audio data read from the SIM card and to output the audio data through the speaker for identification of the SIM card, wherein the audio data includes audio information associated with an owner of the SIM card, and
    wherein when the image data read from the SIM card includes audio data, the mobile communications terminal is configured to automatically play the audio data from the SIM card through the speaker for identification of the SIM card when the image data for identification of the SIM card is displayed.

11. The mobile communications terminal of claim 10, wherein the SIM card reader is configured to interface with a SIM card, the SIM card comprising:
    a memory chip configured to receive and to store image data and audio data; and
    a microprocessor configured to write image data and audio data to the memory chip, and to read image data and audio data from the memory chip.

12. The mobile communications terminal of claim 11, wherein the microprocessor is configured to receive image data and audio data from an interface unit of the mobile communications terminal and to store the image data and the audio data in corresponding allocated storage spaces in the memory chip.

13. The mobile communications terminal of claim 11, wherein the memory chip comprises:
    a personal verification storage area configured to receive and to store personal information;
    a registration data storage area configured to receive and to store data related to base station registration; and
    an owner data storage area configured to receive and to store the image data and the audio data.

14. The mobile communications terminal of claim 13, wherein the microprocessor is configured to receive image data and audio data from an interface unit of the mobile communications terminal and to store the image data and the audio data in the owner data storage area of the memory chip.

15. The mobile communications terminal of claim 14, wherein the image data read from the SIM card to display on the display screen includes pictures or characters associated with the owner of the SIM card.

16. The mobile communications terminal of claim 15, wherein the mobile communications terminal is configured to transmit audio data read from the SIM card through the speaker of the mobile communications terminal, when power is first applied to the mobile communications terminal for identification of the owner of the SIM card.

17. The mobile communications terminal of claim 13, wherein the personal information stored in the personal verification storage area includes a personal identification number (PIN) that allows for use of the mobile communications terminal and access to other data stored on the memory chip.

18. The mobile communications terminal of claim 15, wherein the mobile communications terminal is configured to automatically display the image data read from the SIM card on the display screen of the mobile communications terminal, when power is first applied to the mobile communications terminal for identification of the owner of the SIM card.

* * * * *